Patented Aug. 10, 1926.

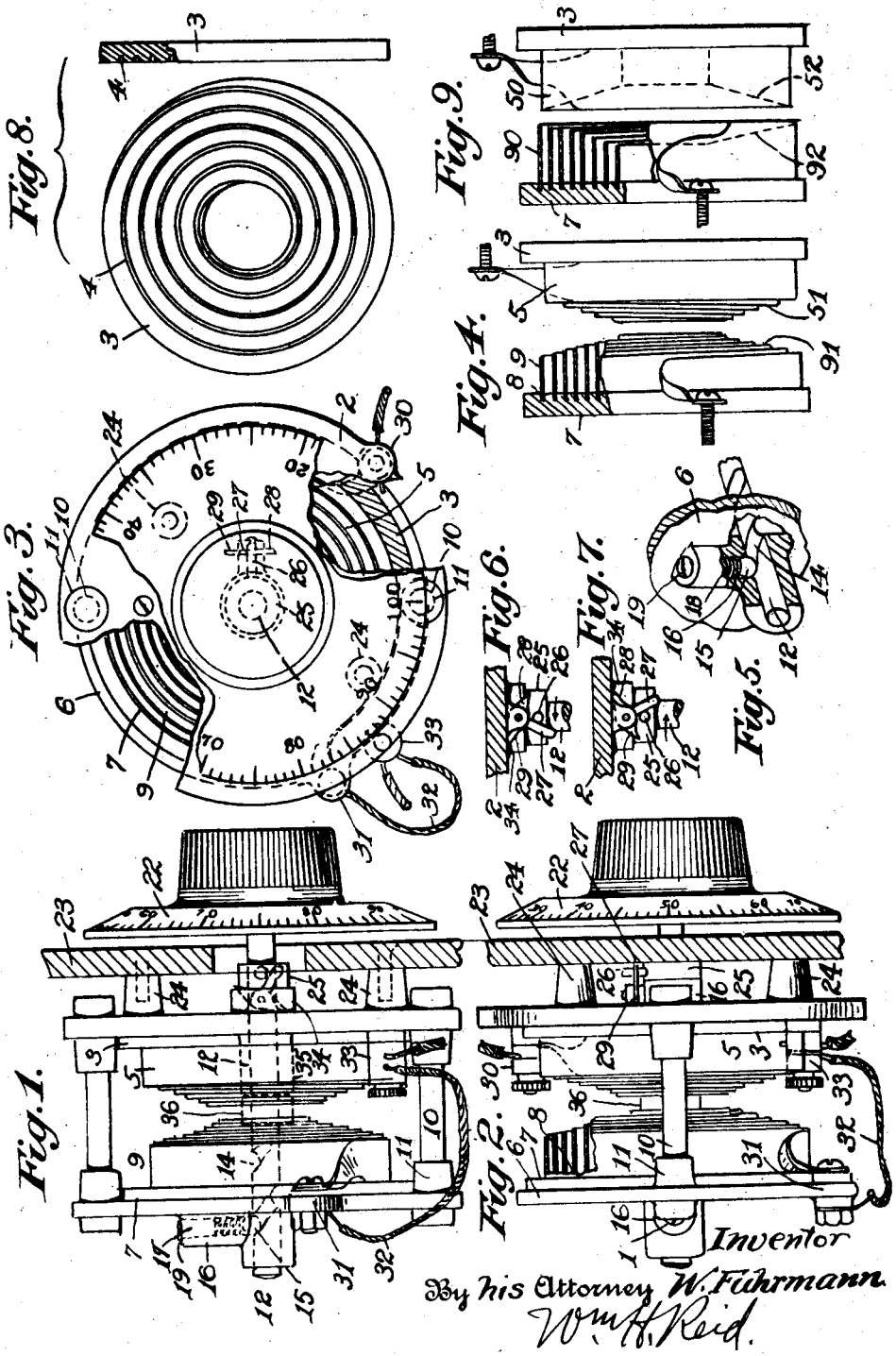

1,595,184

UNITED STATES PATENT OFFICE.

WARREN FUHRMANN, OF WESTFIELD, NEW JERSEY, ASSIGNOR TO THE FURNELL MANUFACTURING CORP., OF NEWARK, NEW JERSEY, A CORPORATION OF NEW JERSEY.

CONDENSER FOR ELECTRIC CIRCUITS.

Application filed December 30, 1924. Serial No. 758,798.

This invention has for its object to produce a condenser for radio and other purposes, that will be more simple in its construction and arrangement and will give greater efficiency, and which also will give a greater range of capacity, and with finer adjustment than such devices that have been produced.

A further object of the invention is to provide a device of this character in the form of two evolute elements in which the two members as brought together will have their meeting edges register progressively rather than simultaneously.

In the accompanying drawing showing embodiments of my invention, Figure 1 is a side elevation broken away at parts.

Fig. 2 is a side elevation with the device turned through a quarter of a circle.

Fig. 3 is an end view partly broken away.

Fig. 4 indicates the two coils in the open position.

Fig. 5 shows enlarged the shaft connection with the movable elements.

Figs. 6 and 7 show the stop device in opposed positions.

Fig. 8 shows the base from one of the coils, in plan and side view partly in section.

Fig. 9 shows the modified form of the coils.

As shown in the drawings, the device comprising essentially two elements, each in the form of an evolute strip, mounted to have a relative movement axially to be brought thereby to interleave, and which being each connected to one terminal of a circuit, will produce a capacitance effect, that will vary as the plates are moved to cause greater or less area of adjacent opposite interleaving faces; and in connection therewith a shaft rotates on one of the members, and engages the other member, to move the coils in and out as the shaft turns, whereby one complete revolution of the shaft by a suitable dial or handle, will produce a continuous movement of the coils, in one or the other direction.

I have set forth herein, a device comprising a supporting frame plate 2, that has fixed thereto a disk 3 of insulating material such as hard rubber or other composition, which plate is preferably provided with a groove or channel 4. A pair of capacity elements are provided each in the form of a strip preferably of sheet metal that is bent into the form of an evolute coil 5 with the convolutions spaced apart as indicated in Fig. 5. A groove 4 in the disk 3 is similarly arranged in the evolute form, and one edge of this coil 5 is inserted in this groove and secured therein, preferably by a driving fit. The disk 3 is suitably secured at one side to the frame plate 2. Another supporting plate 6 is provided that carries an insulating disk 7, containing an evolute groove 8, corresponding with the grooved disk 3. The second coil 9 is a bar strip of sheet metal, bent to an evolute form, similar to the coil 5, and this second coil has its edge on one face secured in the groove 8. The plate 6 is mounted on the supporting plate for movement to and from plate 6, and preferably is guided by posts 10 projecting from the plate 2 that each projects into a bearing boss 11, on the opposite side of the frame plate 6.

The two coils 5 and 9, that are similar, are relatively designed to interleave to bring their opposite side faces into close proximity but without contact when advanced as indicated in Fig. 2. By this arrangement, when plate 6 is moved toward plate 2, the edge on one face of each coil will enter between the convolutions of the other coil, that will produce the same effect as in the usual form of condensers where the set of rotor plates enters between the set of stator plates. By connecting each of these insulating coils 5 and 9 with a different terminal of a circuit, the usual capacitance effect will result. Obviously the moving the coil 9 into the coil 5 a greater or less distance, will vary such effect, as the area of adjacent faces will vary in proportion to such movement.

In devices of this kind it is customary to cause an adjustment by turning a dial and shaft and I have set forth a shaft that can be turned one complete rotation to produce a continous movement of one coil relative to the other coil. In the usual form of condenser with a stator and a rotor, the rotor can turn only through one half of a revolution to adjust from zero to the maximum. As shown I mount a shaft 12 provided with a screw-threaded connection with the movable plate 6, whereby swinging this shaft will advance and retract the plate 6. The shaft 12 may be provided with a groove 14 in the form of a screw-thread, which groove receives on one side a ball 15 placed in a bore or socket 16 in a boss 17 on the plate 2. In each socket is placed a coil spring 18, that is pressed against the ball by a screw 19 in the threaded outer portion of the socket 16. The shaft 12 is adapted to carry a dial 22, and the frame plate 2 can be bolted to the customary panel 23 by bosses 24 as indicated. The screw-thread connection shown is preferably so designed that one complete turn of the dial and shaft will advance the movable element 9 from the position just free of the other coil 5, to a position in which the coil 9 moves the full distance into the coil 5, and thereby produces maximum capacitance effect. Obviously one complete reverse rotation of the dial will return the two coils to separated relative positions.

The rotation of the shaft will obviously move the plate and coil 6 until it strikes certain parts to limit its movements. It is desirable to have limit stops when the shaft and dial complete one revolution. A stop on the shaft engaging a stop on the frame will not permit a full revolution, as the fixed stop engages on opposite sides the opposite sides of the stop on the shaft, such as pins. To overcome this objection I provide a collar 25 fixed to shaft 12, with a projecting pin 26. On the plate 2 is pivoted a three-arm lever, having one arm 27 engaged by pin 25 on opposite sides at the end portion of the shaft revolution. This lever has its other arms 28 and 29 arranged to alternately strike plate 2. In Fig. 7 this is shown with pin 26 and shaft arrested from further movement to the left, as such lever has arm 29 engaging plate 2. At reverse swing of the shaft pin 26 will engage arm 27 on its opposite side and swing this lever until arm 28 strikes plate 2. This will bring pin 26 to the same position on the opposite of lever 27, now shifted to the right, and complete revolution is thereby produced.

The shaft 12 turns in hubs 34 and 35 on plate 2 held from shifting by collars 25 and 36.

It will be observed that each coil 5 and 9 is mounted on an insulated base plate, 3 and 7. One end of the coil 3 is brought out and secured to the body 2 that is stationary and is mounted thereon by an insulated terminal 30. The other coil 9 has one end attached to the plate 6 at 31 but insulated therefrom, and there connects with a flexible cable 32 whose other end is secured by an insulating terminal 33 of the bar 21 for connection with the other terminal. Since the movable member has the capacity coil thereon insulated from the member, the shaft that carries the dial is not in circuit, that will eliminate the objectionable feature known as body capacity.

A device of this character is very simple and cheap to construct as it comprises only two bars or strips, and the plane strip is simply bent to this evolute form, for each element, and then its edge is inserted in the evolute groove in the insulating support. The supports are very readily mounted to reciprocate and the simple shaft is mounted on one member and suitably connected with the other member to cause such reciprocation by its rotation. A device of this character is far superior to the present form where five to twenty three plates in each member are mounted to interleave. Such plates must be comparatively free and are very readily bent, which prevents the desired result; or a small particle of foreign matter will easily make a short circuit. With the present arrangement the coils are rigidly secured throughout one face, and are not easily bent, and are protected against any interference by dust or dirt.

What I claim is:

1. An electric condenser comprising two members movably connected to have one member reciprocate on the other member, a capacitance element mounted on each said member composed of a single flat strip curved in the general form of an evolute, said latter elements being constructed and disposed to interleave on reciprocation of the members with the side faces of the elements in close proximity, to thereby increase and decrease the area of said faces brought adjacent and vary the capacitance, and a shaft rotatably mounted on one of said two members and connected with the other of such members to effect said elements by its oscillation, stop members on the shaft and its supporting member, one of which stops is shiftable to permit one complete revolution of the shaft.

2. An electric condenser comprising two members movably connected to have one member reciprocate on the other member, a capacitance element mounted on each said member composed of a single flat strip curved in the general form of an evolute, said elements being constructed and disposed to interleave on reciprocation of the members with the side faces of the elements in close proximity, to thereby increase and decrease the area of said faces brought adjacent and vary the capacitance, a shaft rotatably mounted on one of said two members, and a screw-threaded connection between the shaft and the other of such members to effect said reciprocation of said elements by oscillation of the shaft, said connection comprising a spiral groove in the shaft, a ball mounted in a socket in the frame, a screw turning in a threaded bore of said socket, and a spring between the screw and the ball to press the ball into said spiral groove.

3. An electric condenser comprising two members movably connected to have one member move relative to the other member, capacitance elements each mounted on a respective member and each composed of a single flat strip curved in the general form of an evolute, said elements being constructed and positioned to interleave with the side faces of the elements in close proximity upon reciprocation of the members to thereby increase and decrease the area of said faces brought adjacent and vary the capacitance, one at least of said evolute elements having the entering edges disposed in a substantially conical form in which the edge gradually and continuously increases its distance from a transverse plane from one end of the coiled strip toward the other end, whereby the meeting edges will register progressively from one end of the strip to the other as advanced, and the capacitance effect is uniformly varied at the minimum portion of the movement.

Signed at New York city, N. Y., on December 29, 1924.

WARREN FUHRMANN.